US011539985B2

United States Patent
Mishra et al.

(10) Patent No.: US 11,539,985 B2
(45) Date of Patent: Dec. 27, 2022

(54) NO REFERENCE REALTIME VIDEO QUALITY ASSESSMENT

(71) Applicant: iStreamPlanet Co., LLC, Las Vegas, NV (US)

(72) Inventors: Nachiketa Mishra, Fremont, CA (US); Steven Roeder, Seattle, WA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 0 days.

(21) Appl. No.: 17/124,370

(22) Filed: Dec. 16, 2020

(65) Prior Publication Data

US 2022/0191562 A1 Jun. 16, 2022

(51) Int. Cl.
*H04N 7/16* (2011.01)
*H04N 21/234* (2011.01)
*G06K 9/62* (2022.01)
*G06N 20/20* (2019.01)
*H04N 21/25* (2011.01)

(52) U.S. Cl.
CPC ..... *H04N 21/23418* (2013.01); *G06K 9/6228* (2013.01); *G06N 20/20* (2019.01); *H04N 21/251* (2013.01)

(58) Field of Classification Search
CPC ........... H04N 21/23418; H04N 21/251; H04N 21/6373; H04N 21/2407
USPC ................................................. 725/9, 19, 32
See application file for complete search history.

(56) References Cited

U.S. PATENT DOCUMENTS

| | | | |
|---|---|---|---|
| 9,924,404 B1 | 3/2018 | Salour et al. | |
| 10,440,087 B2 | 10/2019 | Bader et al. | |
| 10,977,711 B1 | 4/2021 | Verma et al. | |
| 11,165,848 B1* | 11/2021 | Larson | H04N 21/8547 |
| 2012/0188882 A1 | 7/2012 | Wilkinson et al. | |
| 2013/0279326 A1 | 10/2013 | Dunne et al. | |
| 2013/0297780 A1 | 11/2013 | Sturrock et al. | |
| 2016/0366202 A1* | 12/2016 | Phillips | H04N 21/6373 |
| 2017/0272465 A1 | 9/2017 | Steele | |
| 2021/0160262 A1 | 5/2021 | Bynum et al. | |

FOREIGN PATENT DOCUMENTS

| | | |
|---|---|---|
| EP | 1103114 B1 | 11/2008 |
| WO | 2017/144506 A1 | 8/2017 |

OTHER PUBLICATIONS

ETSI Technical Report 101 290 V1.3.1 (Jul. 2014), "Digital Video Broadcasting (DVB); Measurement guidelines for DVB systems," ETSI, EBU, Jul. 2014, pp. 1-174.

(Continued)

*Primary Examiner* — Jivka A Rabovianski
(74) *Attorney, Agent, or Firm* — Nicholson De Vos Webster & Elliott LLP

(57) ABSTRACT

A method for video quality assessment implemented by a computing device, where the method includes selecting a first set of frames from an input video source, determining features of the first set of frames for input into a first machine learning model, applying the first machine learning model to the features of the first set of frames to obtain a video quality score and a confidence score, and triggering a retraining of the first machine learning model in response to the confidence score being determined to be out of bounds.

20 Claims, 6 Drawing Sheets

(56) References Cited

OTHER PUBLICATIONS

Jonathan Stickel, "Data smoothing and numerical differentiation by a regularization method", Oct. 21, 2009, Computers and Chemical Engineering, 34, pp. 467-475 (Year: 2009).
Non-Final Office Action, U.S. Appl. No. 17/124,372, dated Oct. 14, 2021, 13 pages.
Final Office Action, U.S. Appl. No. 17/124,372, dated Mar. 8, 2022, 14 pages.
Notice of Allowance, U.S. Appl. No. 17/124,372, dated May 3, 2022, 7 pages.

* cited by examiner

NO REFERENCE REALTIME VIDEO QUALITY ASSESSMENT

TECHNICAL FIELD

The embodiments of the invention are related to the field of managing video and image content. More specifically, the embodiments of the invention relate to methods and systems for assessing audio and video quality without relying on reference video and audio.

BACKGROUND ART

Video formats, which can include accompanying audio, can vary and have a variety of characteristics related to the quality of the video and audio. When video and audio are transmitted or their format altered, the characteristics of the video and audio can be altered. This can affect the overall quality of the video and audio. As used herein, video quality can refer to characteristics of the video and audio as they are perceived and as compared to the originally captured video and audio (or a similar reference point).

Video processing systems can introduce distortion or artifacts in the video and audio that negatively impact perception of the video and audio by a user as well as the metrics of the characteristics of the video and audio. Measuring and preserving the quality of video and audio is an important aspect of many audio/video technologies.

Many devices, systems, and technologies related to audio/video perform video quality evaluation to measure the quality of an input audio/video source. These video quality evaluation processes can utilize objective mathematical models or subjective assessments (e.g., by user grading or assessment). Objective mathematical models of video quality can approximate results from subjective assessment. The term objective mathematical models can be statistical models in which several independent variables are fit against results obtained in a subjective assessments. The term "objective" mathematical models relate to models that are based on criteria that can be measured objectively, i.e., without subjective assessment. Objective mathematical models can be automatically evaluated by a computer program and deterministically output the same quality score for a given set of input parameters.

Objective mathematical models can rely on an original or 'reference' source as a basis for quality assessment, that is the input source quality is measure relative to how different it is from the reference source. This type of objective mathematical model for video quality assessment is referred to as a full-Reference objective mathematical model or 'full reference method.'

Full reference methods compute a quality difference by comparing the original audio/video signal against the received audio/video signal. Every pixel from the source can be compared to the corresponding pixel of the input video. Full reference methods can be highly accurate, but require high computational resources and access to the reference video. Because this method requires the availability of the original video at the time of quality assessment the method cannot be used in all scenarios (e.g., where the quality is assessed at an end user device).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
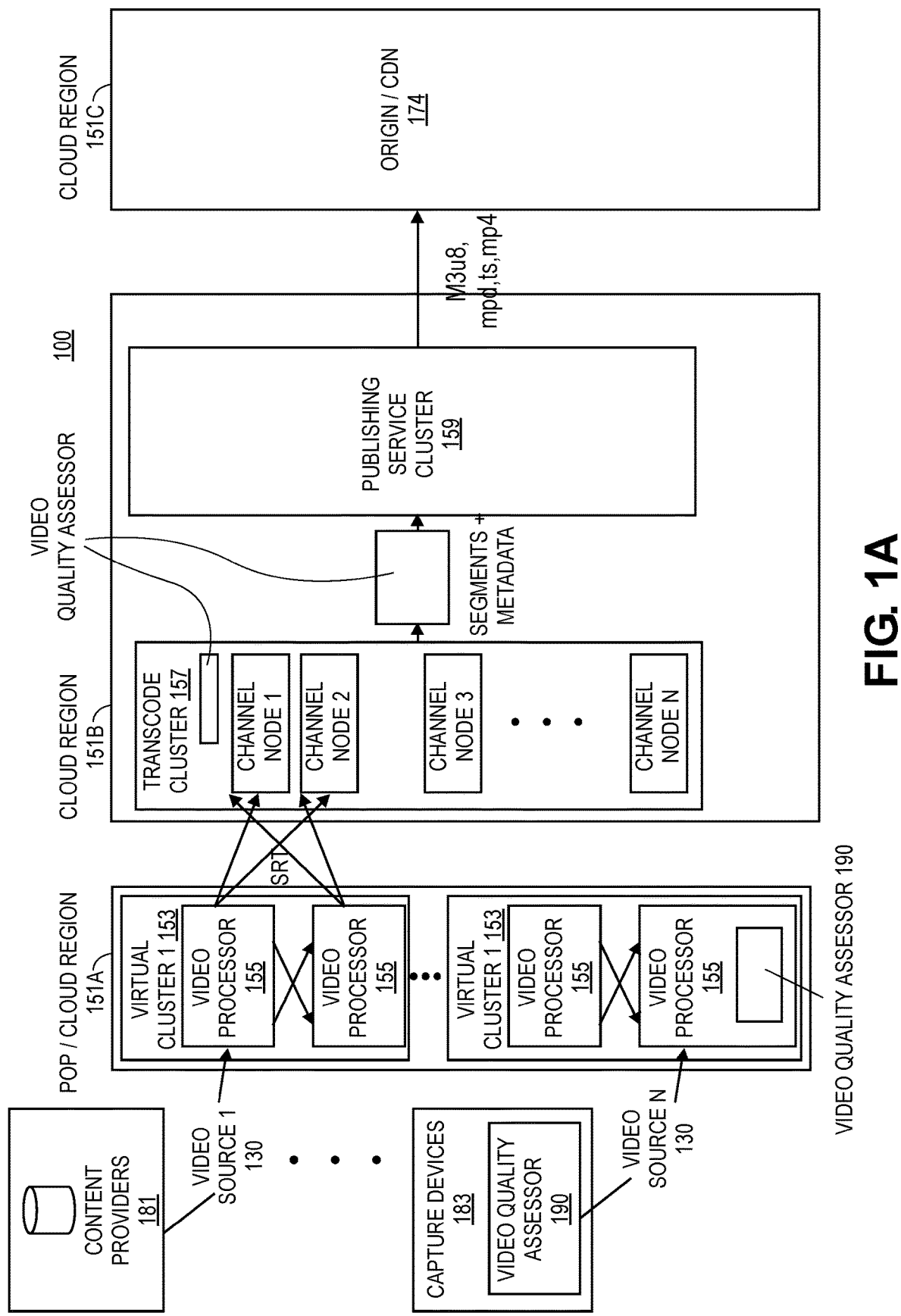
FIG. 1A is a diagram of one embodiment of a video streaming system supporting video quality assessment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

FIG. 1A is a first embodiment of a video streaming system to support video quality assessment in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP 151A can be provided by an internet service provider or similar interface through which external resources and electronic devices can interact with the cloud computing environment.

In an example embodiment, the video streaming system 100 includes a set of virtual clusters 153, a transcode cluster 157, and a publishing service cluster 159. Each cluster can be composed of any number and combination of electronic devices including servers, storage devices, networking devices and related devices that make up a cloud computing environment. The virtual clusters 153 can support a set of video processors 155. These video processors 155 can execute software components that process the incoming video sources 130 and are hosted by the virtual clusters 153. The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130. Video processors 155 can implement video quality assessment by executing a video quality assessor 190 as well as perform any number of other video processing tasks. While a single video processor 155 is illustrated as providing a video quality assessor 190 any number of the video processors 155 can support this function.

Video sources 130 can be any type of video input in any format that is provided by any source device or set of devices. For example, video sources can be provided by a set of content providers 181, which are sets of devices operated by an entity that produces a video source 130 to be processed by the video streaming system 100. In some cases, the video sources 130 can be provided directly or indirectly by a set of capture devices 183 such as live programming (e.g., sporting events). Any content provider 181, capture device 183, or similar set of devices providing the video sources 130 can execute or be in communication with a device executing a video quality assessor 190. A video quality assessor 190, as further described herein, generates a video quality assessment or score. This video quality assessor 190 process can be implemented at any number of points within the video streaming system 100 such that video quality can be assessed at each stage and compared across stages to identify changes in video quality.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, the publishing service can format the video streams using video encoding formats M3u8, MPD, TS, MP4 and similar video encoding formats. As used herein video, audio/video, and similar terms are used interchangeably to include video formats that may also encompass audio aspects.

Figure 1B:
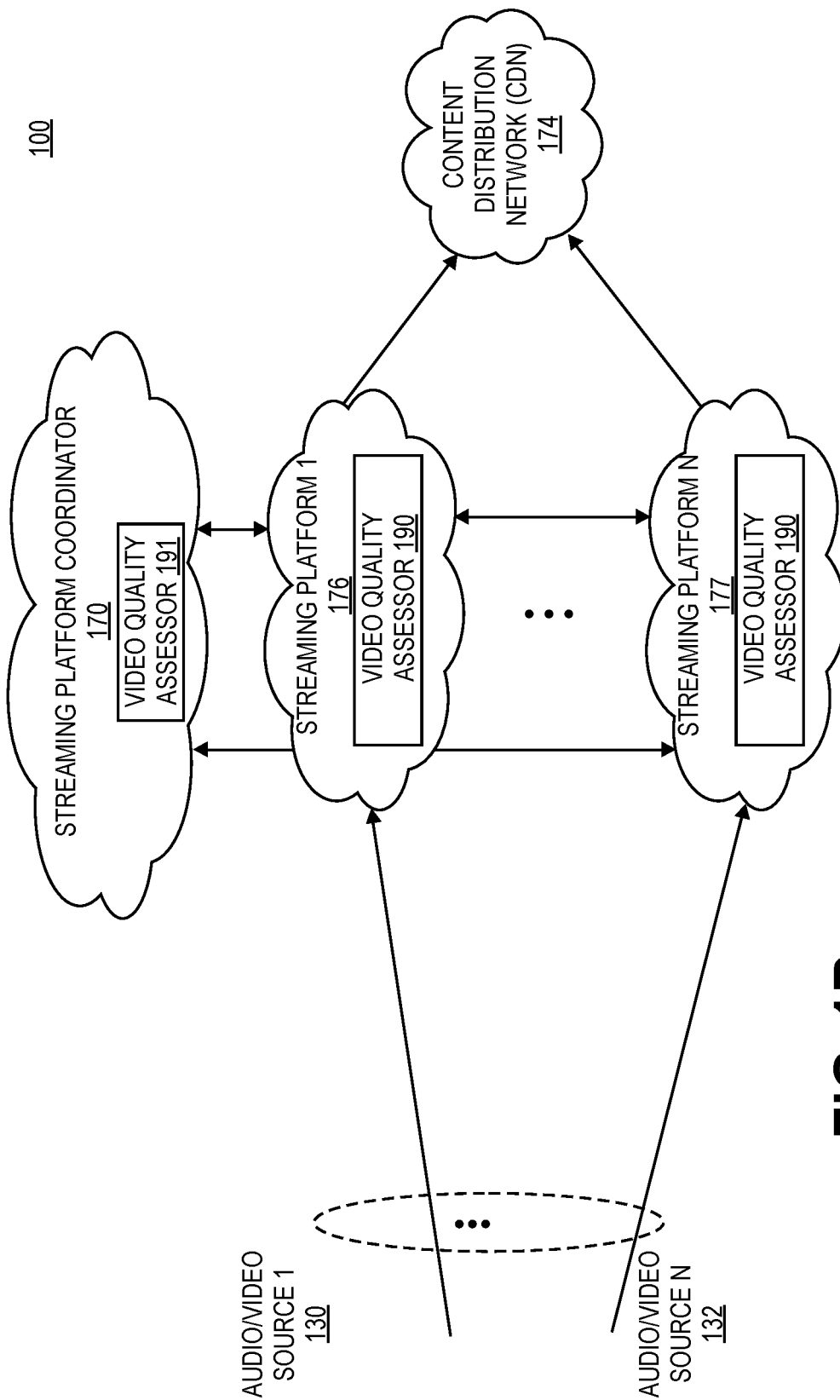
FIG. 1B is a diagram of another embodiment of a video streaming system containing multiple video streaming platforms.

FIG. 1B illustrates another embodiment of a video streaming system containing multiple video streaming platforms. A video streaming system 100 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain any number of video quality assessment processes, which is illustrated as a set of video quality assessors 190 in streaming platforms 1-N, respectively. The video quality assessors are to process and generate a video quality score or assessment for input video sources 130-132, caused by processing media workflows created for video sources in a video streaming platform as discussed in more details herein below, or in similar processing of the received media (i.e., video) as it is received from the video sources, handled by the streaming platforms, and forwarded via the content distribution network 174.

In some embodiments, the streaming platform coordinator 170 may contain a video quality manager 191 that similarly generates video quality assessments, that manages the video quality assessors 190 across the streaming platforms, or that collects video quality scores or similar metrics from the video quality assessors from the processing of media workflows in all video streaming platforms the streaming platform coordinator 170 interacts with, and the streaming platform coordinator 170 may manage or coordinate notifying a feedback mechanism or corrective components to address any issues in video quality. The video quality manager 191 can also coordinate resources related to the video quality assessors 190 at different video streaming platforms. Where a feedback mechanism is available in the system 100 the video quality manager 191 or video quality assessors 190 can send notification of changes in video quality to the feedback mechanism that may report the changes to a video source or administrator. In cases where corrective components are available in the system 100, the reporting of the changes in video quality can trigger further processing to correct or ameliorate the video quality issues. The reporting of the video quality changes can specify the video quality scores, metrics related to the video quality for the video source as well as other relevant information for correcting or monitory the video quality in the system 100.

Video Streaming Platform in a Cloud Computing Environment

A set of video streaming platforms is a main component of a video streaming system 100 as illustrated in FIG. 1B. The video streaming platforms 176 and the video streaming system 100 can perform any number of operations to process any number of input video sources 130-132 and output via a content distribution network 174 to reach any number of consuming devices and software applications. The operations performed on the video sources 130-132 can include the video quality assessment processes described herein implemented by video quality assessors 190 and similar components. Each streaming platform 176 can execute any number of video quality assessors 190 using workers or similar mechanism as described further herein. The video quality assessors 190 can operate on a per streaming platform 176, per video source 130-132 or similar basis.

Figure 2:
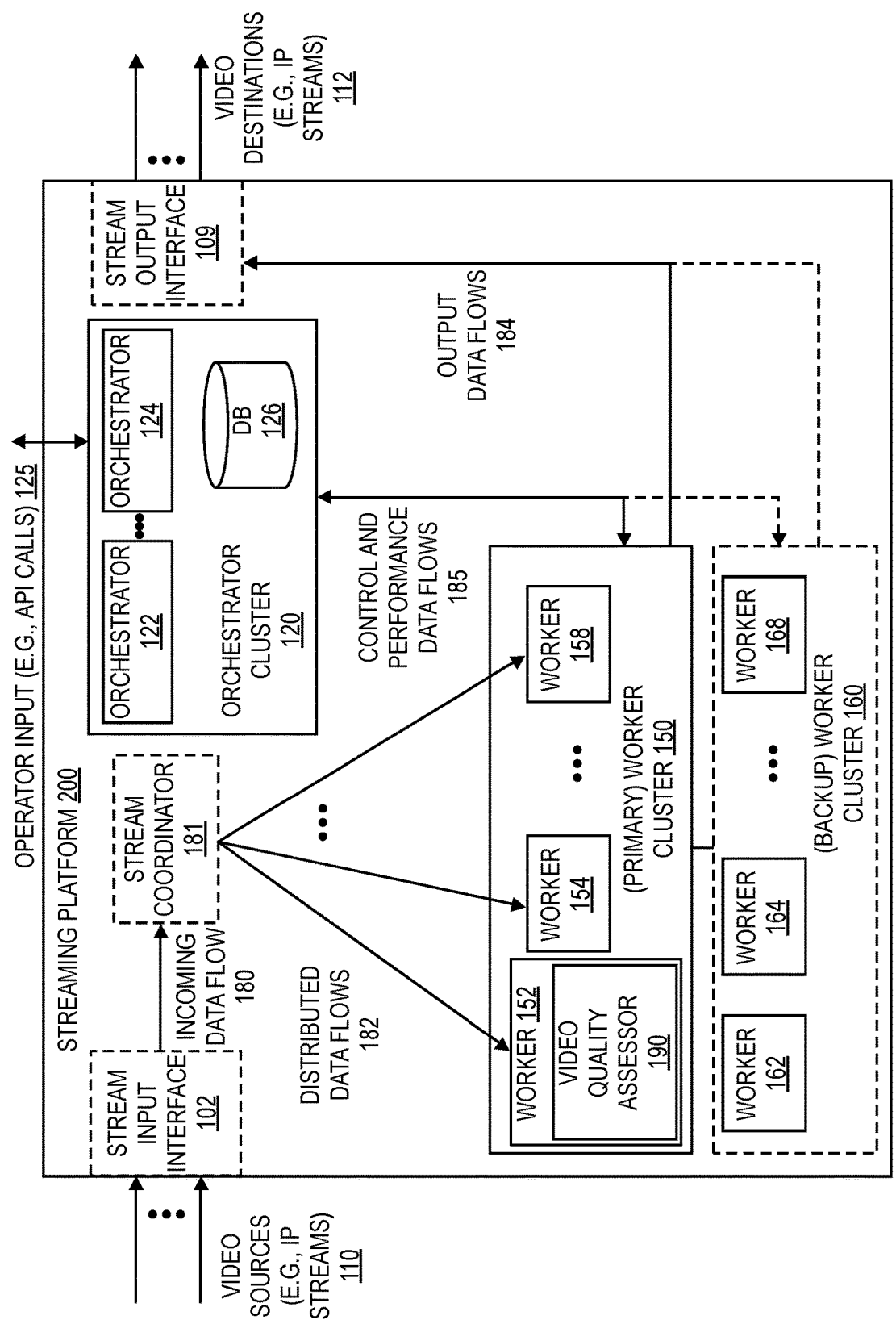
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD) and any other type or combination of pre-recorded audio/video content.

A video source may be "pushed" to the streaming platform 200 where the video source is IP packet streams such as the Moving Picture Experts Group (MPEG)—transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In the alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that in some embodiments orchestrator cluster 120 also contains a video quality manager 191 and/or video quality assessors 190. The video quality manager 191 monitors the video quality assessors 190 in the streaming platform 200 through collecting performance data from the workers (e.g., the performance data collected along with the control flows, as the control and performance data flows illustrated at reference 185) and determines if any video quality changes are detected. When changes in video quality are detected, the video quality manager 191 and/or the video quality assessors 190 can initiate mitigation and/or provide notification (e.g., to an operator of the streaming platform 200 and/or to a streaming platform coordinator). While the video quality manager 191 is illustrated a standalone entity of the orchestrator cluster 120, the video quality manager 191 may be integrated with other entities such as orchestrators 122-124. Additionally, a portion of the video quality manager 191 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may receive input also from an operator separately from the streaming platform coordinator 170. The operator input may be in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone video quality assessment with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Video Quality Assessment in a Video Streaming Platform

The embodiments provide a video quality assessment process that is not based on a full-reference or semi-referenced models, which are based on natural scene statistics or manually tagged mean opinion score (MOS) scoring systems. Video quality assessment such as video multimethod assessment fusion (VMAF), peak signal to noise ratio (PSNR), and structural similarity index measure (SSIM) are metrics used for video quality assessment. However, for live videos stream which have captions, scene cuts, advertisements, and similar components, the aforementioned metrics do not produce effective video quality assessment and are computationally intensive. The embodiments provide a machine learning algorithm and architecture for video quality assessment that uses compression parameters with auto-tagged continuous values to assess video quality in real time.

Existing video quality assessment algorithms are full reference or semi-referenced models that are trained on white-labeled videos (i.e., video sources that do not have markings such as logos and similar content). The current algorithms are based on natural scene statistics, signal-to-error ratios, or structural similarity. These video quality assessment process do not provide accurate assessment for videos that have captions, advertisements, logos, or other text or graphics. These existing processes also need a source reference to train to predict quality. In live video streams natural scene statistics based metrics do not produce effective quality measurements within acceptable latency requirements.

The embodiments overcome the limitations of existing video quality assessments by using compression parameters that represent temporal and spatial compression artifacts (e.g., quantization parameter, motion vectors, bitrate, scene cuts, and derived parameters) with auto-tagged continuous variables to train machine learning models that can assess video quality in real-time. The embodiments extract the aforementioned parameters from received or input frames (e.g., any sub set of the received frame including in some embodiments each received frame) and derives normalized statistical features for the inspected frames. The input videos are auto-tagged using transfer learning and machine learning models that are trained on the statistical features as input with the continuous values from the tagging process as the output. Distributed machine learning pipelines are used to extract statistical features from live video streams and a trained model is used to assess the video quality in real-time. The embodiments use transfer learning to train a machine learning model that can assess content in each video frame based on compression parameters and predict the quality of the content by providing a score over a defined range (e.g., between 0-100). This can be done in real time and scaled in the cloud for multiple live streams. The embodiments provide an advantage over the existing art by automatically enabling assessment of video quality in real time for video sources as they travers the streaming platform. Being able to generate accurate video quality assessments for video sources in real-time enables smarter live stream and live-to-VOD processing based on the video quality.

Figure 3:
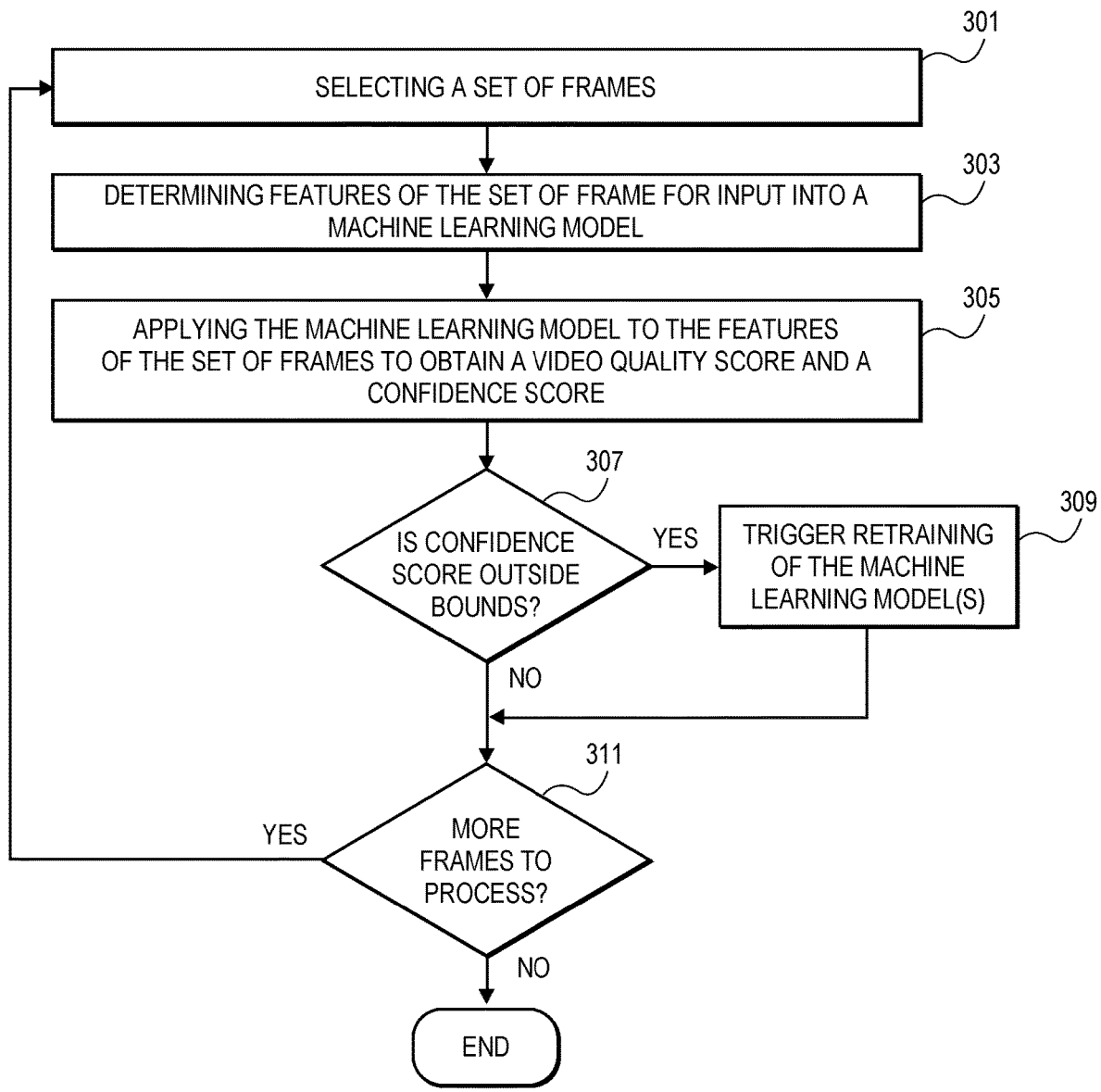
FIG. 3 is a flowchart of one embodiment of a process for generating a video quality score by the video quality assessor.

FIG. 3 is a flowchart of one embodiment of a process for generating real time video quality assessments for streaming media content. The process is illustrated at a high level to represent the overall function of the video quality assessment in a video streaming system 100. The video streaming system receives media (e.g., a video source or stream) from a content producer or similar video source and selects a set of frames from that video source to be processed (Block 301). A sequential processing is illustrated by way of example for clarity and conciseness. A "frame" of the video stream, as used herein, is an image composed of a matrix of pixels in time series with other frames to form the video. The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform. The input video stream can be processed to determine video quality at any rate or interval. In some embodiments, each frame is analyzed for determination of a video quality score, while in other embodiments, groupings of frames are selected for assessment at defined intervals.

The video quality assessor can determine (e.g., extract or measure) a set of values of a set of features of the selected set of frames for input into a machine learning model (Block 303). Any type of machine learning model can be utilized. In some embodiments, a deep discriminative, generative neural network, or similar machine learning model can be utilized. The machine learning model is provided the set of features as input. Any set of features can be selected for input to the machine learning model. Features that are selected and identified in the input frames can include quantization parameters, motion vectors, bitrate, scene cuts, derived parameters, video quality scores from preceding or related frames in the video source, and similar features. These features are selected for real time computation or extraction from the input video frames and can be derived without significant computational latency such that they can be input into the machine learning model without significant delay to the handling of the video source.

Once the set of features are determined for the set of input frames, then they can be applied as input to the machine learning model to generate a video quality score (Block 305). In some embodiments, the machine learning model can also generate a confidence score for the video quality score. The confidence score can have a defined range (e.g., 0 to 100) that indicates the probability of the accuracy of the video quality score. The confidence score can be examined to determine whether the machine learning model requires retraining (Block 307). If the confidence score falls outside a threshold or boundary for acceptable confidence level, then the retraining can be triggered (Block 309). In some embodiments, a confidence score that is out of bounds for a single frame, a set of frames, an averaged confidence score over many frames, or similar metric can be utilized to determine whether the machine learning model is to be retrained. The retraining of the machine learning model can be similar to the initial training of the machine learning model as further described herein below. The retraining can either update and existing machine learning model or generate a new machine learning model. Retraining can shift the set of features selected for input into the machine learning model.

A check is made after the processing of each set of frames to determine if there are more frames to process for the video source (Block 311). As long as the video source is continuing to stream to the destination, then the processing of the video stream can continue (Block 301). If the video stream completes, then the process can end the video quality assessment.

The video quality scores and/or the confidence scores can be consumed by a video quality monitor or other components of the video streaming platform. The video quality scores can be utilized to identify issues with the video streams and for corrective actions to be initiated or for metrics related to the video quality assessment to be logged for later analysis. The video quality assessment process can be executed at any point between a video source and the publishing of the content into the content delivery network (CDN) including multiple instances of the video quality assessment process that can use a shared machine learning model or separate instances and/or separately trained machine learning models to assess the video source at different points in the vide stream platform. In particular, the video quality assessment process can be employed at positions in the video streaming platform that can assess the video quality after other video processing is executed on the video source such as transcoding, upscaling, downscaling, transmission, and similar processes that may affect video quality.

In further embodiments, the received video stream is broken down into individual frames and processed sequentially, in parallel, batches or similarly processed. In some cases, a pre-processing of the frame is performed to enhance the image for video quality assessment. In some implementations, the frame is pre-processed by adjusting (e.g., increasing) image brightness, adjusting contrast, by converting the frame to greyscale, and/or similarly altered to facilitate assessment of video quality.

The video quality assessment process can be used to identify defects in individual frames or sets of frames and/or to produce a video quality score for a video stream in real time or in sufficient real time (e.g., within 1-200 ms). In some embodiments, the video quality assessment process can be applied to determine a video quality score for every individual frame of the video stream. However, in some other implementations, the method can be applied to assess every second/third/fourth/fifth/. . . /$n^{th}$ frame of the video stream or similarly spaced batches of frames.

In some embodiments, the method can be applied to the entire frame of the video stream. However, in some other implementations, the video quality assessment process can be applied to any number or variety of parts of a frame, which can be consistent from frame to frame or can vary over the frames of the video stream.

Figure 4:
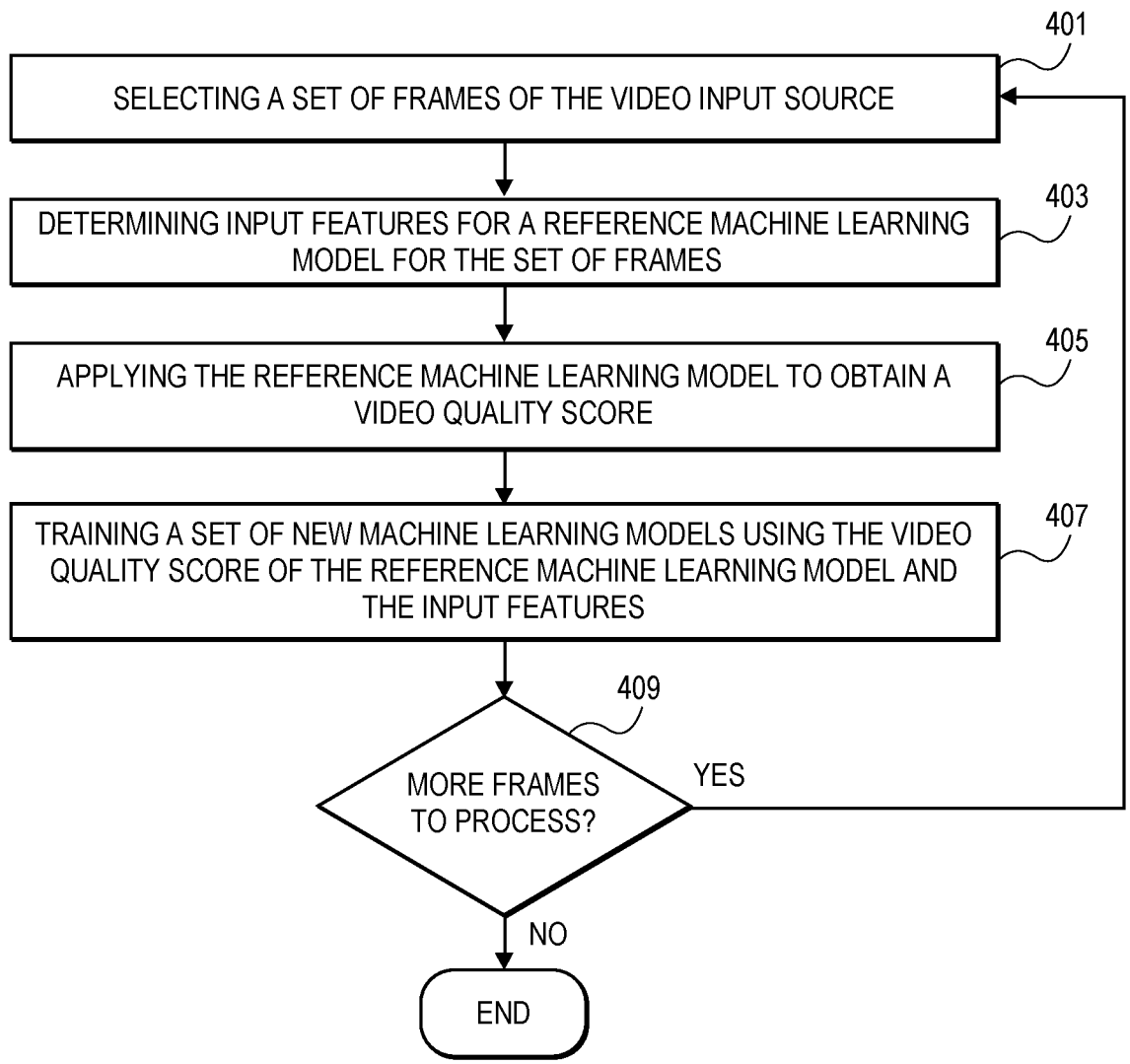
FIG. 4 is a flowchart of one embodiment of a process for training a video quality assessor.

FIG. 4 is a flowchart of one embodiment of a process for training a machine learning model to perform video quality assessment. The illustrated process provides an example process for a video streaming system that includes machine learning training for video quality assessment. The process is illustrated at a high level to represent the overall function of the video streaming system 100. The video streaming system receives media (e.g., a video source or stream) from a content producer or similar video source. The training of the machine learning model can be implemented by the video quality assessor, video quality monitor, or any other component such as a separate training component within the video streaming system 100.

The video streaming system receives media (e.g., a video source or stream) from a content producer or similar video source and selects a set of frames from that video source to be processed (Block 401). A sequential processing is illustrated by way of example for clarity and conciseness. As with the video quality assessment, a "frame" of the video stream is an image composed of a matrix of pixels in time series with other frames to form the video. The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform. The input video stream can be processed to determine video quality at any rate or interval. In some embodiments, each frame is analyzed for determination of a video quality score, while in other embodiments, groupings of frames are selected for assessment at defined intervals.

The training process can determine (e.g., extract or measure) a set of values of a set of features of the selected set of frames to be associated with the frames to be input into a reference machine learning model (Block 403). Any type of reference machine learning model can be utilized. In some embodiments, a deep discriminative, generative neural network, or similar machine learning model or similar reference machine learning model can be utilized. The reference machine learning model is provided the set of frames as input. As mentioned, from the set of input frames, the associated set of features can be selected for input to a new machine learning model to be trained. Features that are selected and identified in the input frames can include quantization parameters, motion vectors, bitrate, scene cuts, derived parameters, video quality scores from preceding or related frames in the video source, and similar features. These features are selected for use in real time computation or extraction from the input video frames and can be derived without significant computational latency such that they can be input into the new machine learning model to be trained without significant delay to the handling of the video source.

Once the set of features are determined for the set of input frames, then the frames can be applied as input to the reference machine learning model to generate a video quality score (Block 405). In some embodiments, the reference machine learning model can also generate a confidence score for the video quality score. The confidence score can have a defined range (e.g., 0 to 100) that indicates the probability of the accuracy of the video quality score, this confidence score can be used as a feature for training the new machine learning model. The video quality score and extracted features of the frames are input into the new machine learning model for training (Block 407). In some embodiments multiple new machine learning models can be trained using the video quality score and each can be trained on different combinations of input features along with the video quality score. Those models that perform the best may be favored for further utilization while other models that do not perform well can be discarded.

A check is made after the processing of each set of frames to determine if there are more frames to process for the video source (Block 409). As long as the video source is continuing to stream to the destination, then the processing of the video stream can continue (Block 401). If the video stream completes, then the process can end the video quality assessment. When the process completes each of the new trained machine learning models can be categorized as applicable to video sources similar to that of the input video source. For example, if the input video source was a sporting event (e.g., a football game), then new trained machine learning models can be categorized as applicable to sporting events, which can be used to select the new trained machine learning models for real time use for video quality assessment (e.g., as described in relation to FIG. 3).

In further embodiments, the received video stream is broken down into individual frames and processed sequentially, in parallel, batches or similarly processed for training. In some cases, a pre-processing of the frame is performed to enhance the image for video quality assessment. In some implementations, the frame is pre-processed by adjusting (e.g., increasing) image brightness, adjusting contrast, by converting the frame to greyscale, and/or similarly altered to facilitate assessment of video quality.

In some embodiments, the training method can be applied to the entire frame of the video stream. However, in some other implementations, the training process can be applied to any number or variety of parts of a frame, which can be consistent from frame to frame or can vary over the frames of the video stream.

Electronic Devices Implementing Embodiments of the Invention

Figure 5:
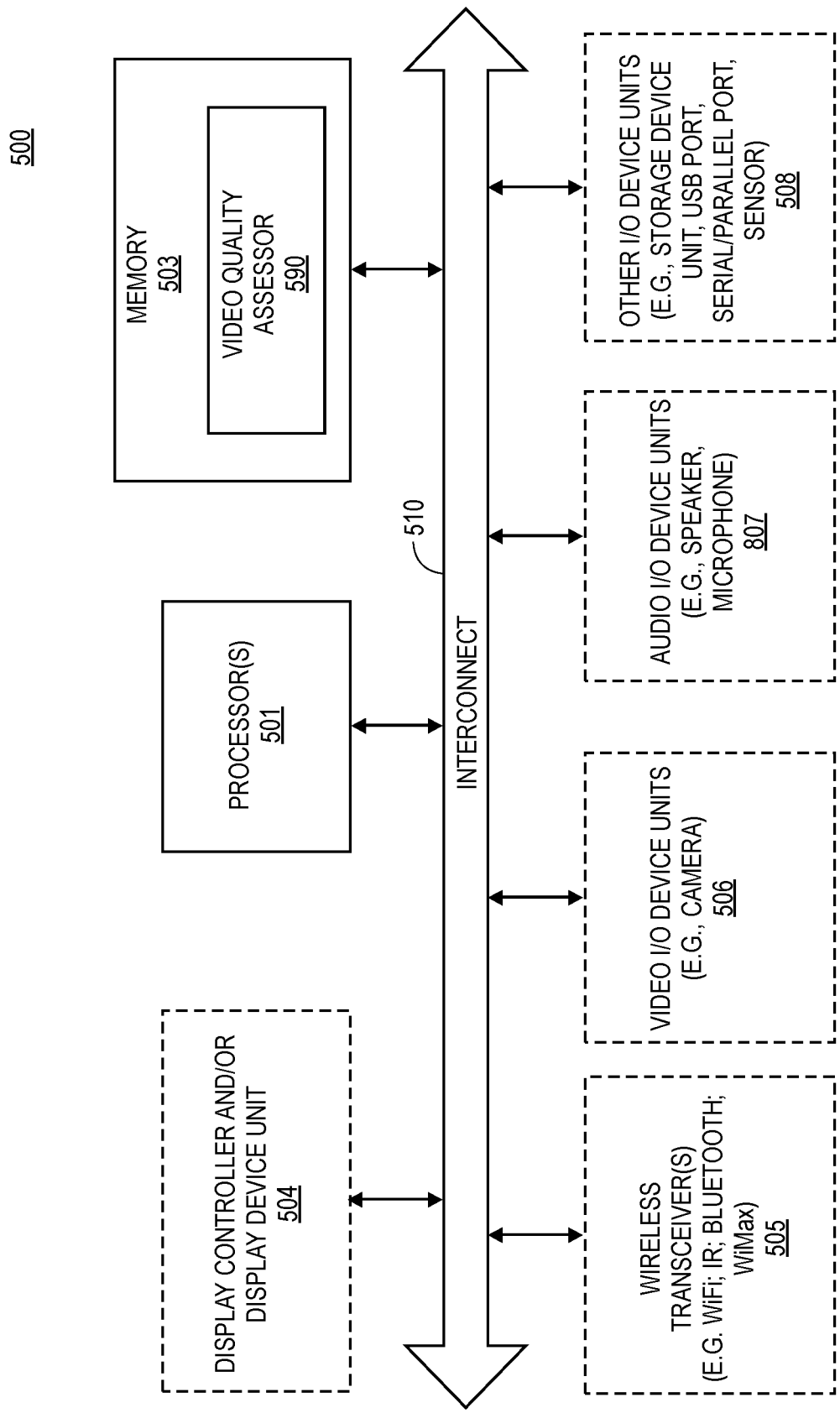
FIG. 5 is a block diagram illustrating an electronic device that may serve as a video quality assessor of a video streaming platform in a cloud computing environment according to one embodiment of the invention.

FIG. 5 is a block diagram illustrating an electronic device that may serve as a video quality assessor of a video streaming platform in a cloud computing environment according to one embodiment of the invention. The electronic device may be a computing device (e.g., a computer server) of a cloud computing environment). The system 500 may represent the video quality assessor 590 and or video quality manager described above performing any of the processes or methods for training machine learning models and applying the trained machine learning models to assess video quality in real time in a video streaming system described above. The system 500 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 500 is intended to show a high level view of many components of the computing system. However, it is to be understood that additional components may be present in certain implementations and furthermore, different arrangement of the components shown may occur in other implementations.

In one embodiment, the system 500 includes a processor 501, memory 503, and optionally device units 504-508 that are interconnected via a bus or an interconnect 510. A processor 501 may represent a single processor or multiple processors with a single processor core or multiple processor cores included therein. The processor 501 may represent one or more general-purpose processors such as a microprocessor, a central processing unit (CPU), or processing device. More particularly, the processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 501 may communicate with the memory 503, which in an embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the processor 501, or any other device units. For example, executable code and/or data of a variety of operating systems, device drivers, firmware (e.g., input output basic system or BIOS), and/or applications can be loaded in the memory 503 and executed by the processor 501. An operating system can be any kind of operating systems, such as, for example, Windows® operating system from Microsoft®, Mac OS®/iOS® from Apple, Android® from Google Linux®, Unix®, or other real-time or embedded operating systems such as VxWorks.

The memory 503 contains a video quality assessor 590, manager, or related components for training, which may contain instructions to perform the operations of these components as discussed herein above. The video quality assessor 590 and related components may contain functional blocks that implement functions as described herein with relation to the video quality assessment process and related training processes discussed herein above. The processor 501 may instantiate the video quality assessor 590 and related components to perform operations to as discussed herein above.

The system 500 may optionally further include input/output (I/O) devices such as the device units 504-508, including display control and/or display device unit 504, wireless transceiver(s) 505, video I/O device unit(s) 506, audio I/O device unit(s) 507, and other I/O device units 508 as illustrated. The wireless transceiver 505 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 500 may also include an ultrasound device unit (not shown) for transmitting a conference session code.

The video I/O device unit 506 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 507 may include a speaker and/or a microphone to facilitate voice-enabled functions, such as voice recognition, voice replication, digital recording, and/or telephony functions. Other optional devices 508 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 508 may further include certain sensors coupled to the interconnect 510 via a sensor hub (not shown), while other devices such as a keyboard or thermal sensor may be controlled by an embedded controller (not shown), dependent upon the specific configuration or design of the system 500.

The system 500 may be coupled to an orchestrator in an orchestrator as illustrated in FIG. 2. Additionally, the system 500 may be integrated within a streaming platform coordinator 170, similar to the video quality assessor 190 illustrated in FIG. 1. The system 500 may perform methods discussed herein above relating to FIGS. 3 and 4.

Note that while the system 500 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method for video quality assessment implemented by a computing device, the method comprising:
    selecting a first set of frames from an input video source;
    determining features of the first set of frames for input into a first machine learning model;
    applying the first machine learning model to the features of the first set of frames to obtain a video quality score and a confidence score that indicates a confidence level of the video quality score; and
    triggering a retraining of the first machine learning model in response to the confidence score being determined to be out of bounds indicating a low probability of accuracy of the video quality score, and checking for further frames from the input video sources for the video quality assessment in response to the confidence score being determined to be within a defined range of the confidence score,
    wherein frames within the first set of frames are to be distributed from the input video source to a content delivery network.

2. The method of claim 1, wherein the features include any one or more of quantization parameters, motion vectors, bit rate, scene statistics, standard deviation of quantization parameters, or standard deviation of motion vector.

3. The method of claim 1, wherein the video quality score is generated without reference to an original frame of the input video source.

4. The method of claim 1, further comprising:
determining the features from metadata of the first set of frames.

5. The method of claim 1, wherein the retraining further comprises:
selecting a second set of frames of the input video source;
determining input features for a second machine learning model for the second set of frames;
applying the second machine learning model to obtain a second video quality score; and
training a third machine learning model using the second video quality score and the input features for the second machine learning model.

6. The method of claim 5, wherein the first machine learning model is trained via transfer learning from the third machine learning model.

7. A non-transitory machine-readable storage medium that provides instructions that, if executed by a processor, will cause said processor to perform operations of video quality assessment comprising:
selecting a first set of frames from an input video source;
determining features of the first set of frames for input into a first machine learning model;
applying the first machine learning model to the features of the first set of frames to obtain a video quality score and a confidence score that indicates a confidence level of the video quality score; and
triggering a retraining of the first machine learning model in response to the confidence score being determined to be out of bounds indicating a low probability of accuracy of the video quality score, and checking for further frames from the input video sources to perform the operations of the video quality assessment in response to the confidence score being determined to be within a defined range of the confidence score;
wherein frames within the first set of frames are to be distributed from the input video source to a content delivery network.

8. The non-transitory machine-readable storage medium of claim 7, having further instructions stored therein, which when executed by the processor cause the processor to perform additional operations, wherein the features include any one or more of quantization parameters, motion vectors, bit rate, scene statistics, standard deviation of quantization parameters, or standard deviation of motion vector.

9. The non-transitory machine-readable storage medium of claim 7, having further instructions stored therein, which when executed by the processor cause the processor to perform additional operations, wherein the video quality score is generated without reference to an original frame of the input video source.

10. The non-transitory machine-readable storage medium of claim 7, having further instructions stored therein, which when executed by the processor cause the processor to perform additional operations, further comprising:
determining the features from metadata of the first set of frames.

11. The non-transitory machine-readable storage medium of claim 7, having further instructions stored therein, which when executed by the processor cause the processor to perform additional operations, wherein the retraining further comprises:
selecting a second set of frames of the input video source;
determining input features for a second machine learning model for the second set of frames;
applying the second machine learning model to obtain a second video quality score; and
training a third machine learning models using the second video quality score and the input features for the second machine learning model.

12. The non-transitory machine-readable storage medium of claim 11, having further instructions stored therein, which when executed by the processor cause the processor to perform additional operations, wherein the first machine learning model is trained via transfer learning from the third machine learning model.

13. An electronic device comprising:
a non-transitory machine-readable storage medium having stored therein a video quality assessor; and
a processor coupled to the non-transitory machine-readable storage medium, the processor to perform operations of video quality assessment, the operations are to select a first set of frames from an input video source, to determine features of the first set of frames for input into a first machine learning model, to apply the first machine learning model to the features of the first set of frame to obtain a video quality score and a confidence score that indicates a confidence level of the video quality score, and to trigger a retraining of the first machine learning model in response to the confidence score being determined to be out of bounds indicating a low probability of accuracy of the video quality score, and check for further frames from the input video sources to perform the operations of the video quality assessment in response to the confidence score being determined to be within a defined range of the confidence score, wherein frames within the first set of frames are to be distributed from the input video source to a content delivery network.

14. The electronic device of claim 13, wherein the features include any one or more of quantization parameters, motion vectors, bit rate, scene statistics, standard deviation of quantization parameters, or standard deviation of motion vector.

15. The electronic device of claim 13, wherein the video quality score is generated without reference to an original frame of the input video source.

16. The electronic device of claim 13, the video quality assessor to further to determine the features from metadata of the first set of frames.

17. The electronic device of claim 13, wherein the retraining further includes selecting a second set of frames of the input video source, determining input features for a second machine learning model for the second set of frames, applying the second machine learning model to obtain a second video quality score, and training a third machine learning model using the second video quality score and the input features for the second machine learning model.

18. The electronic device of claim 17, wherein the first machine learning model is trained via transfer learning from the third machine learning model.

19. The method of claim 1, wherein the confidence score to be used as one additional feature for the retraining.

20. The method of claim 1, wherein the features comprise compression parameters that represent temporal and spatial compression artifacts of the first set of frames.

* * * * *